May 9, 1950     R. D. GERWE ET AL     2,507,438
METHOD OF COLORING CITRUS FRUIT
Filed Feb. 27, 1947     6 Sheets-Sheet 1
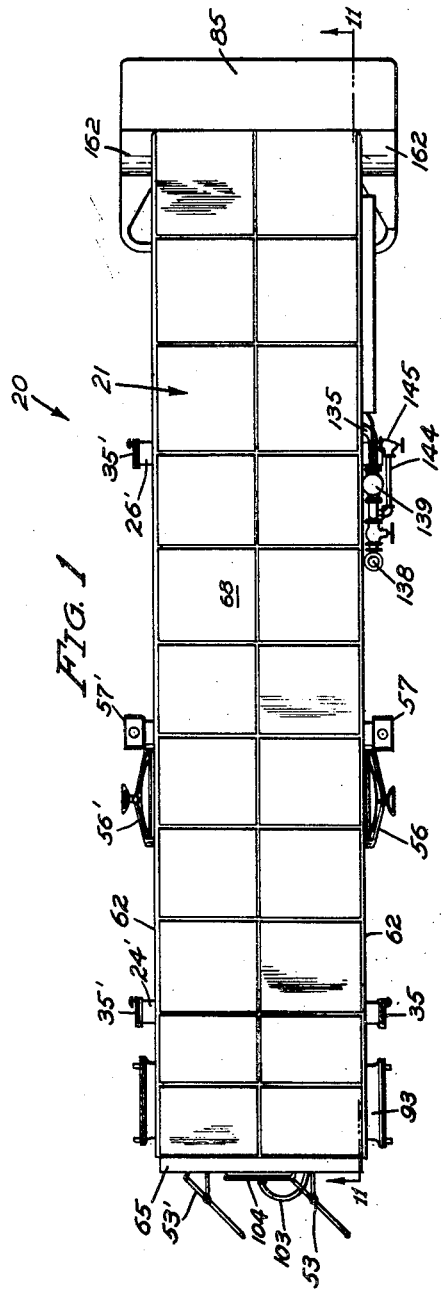
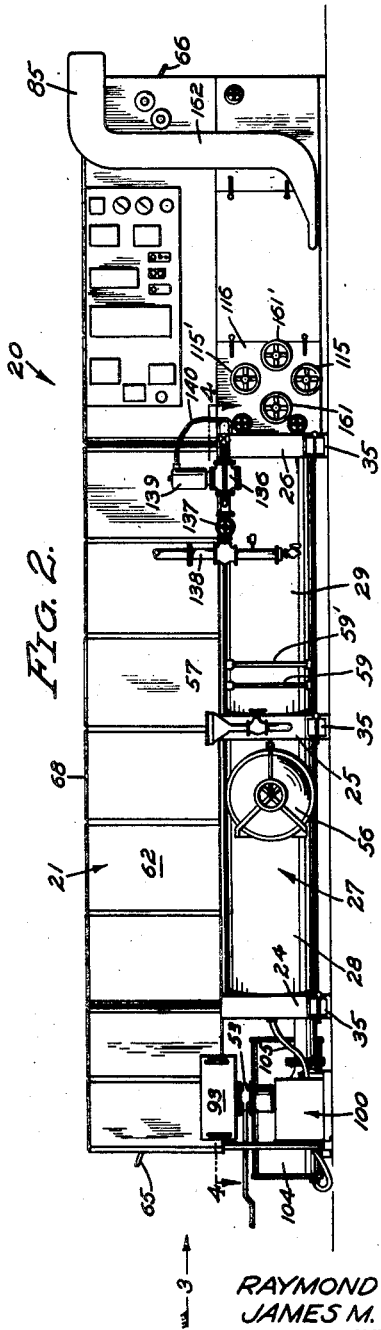
RAYMOND D. GERWE
JAMES M. FISKE
INVENTOR.
BY
ATTORNEY

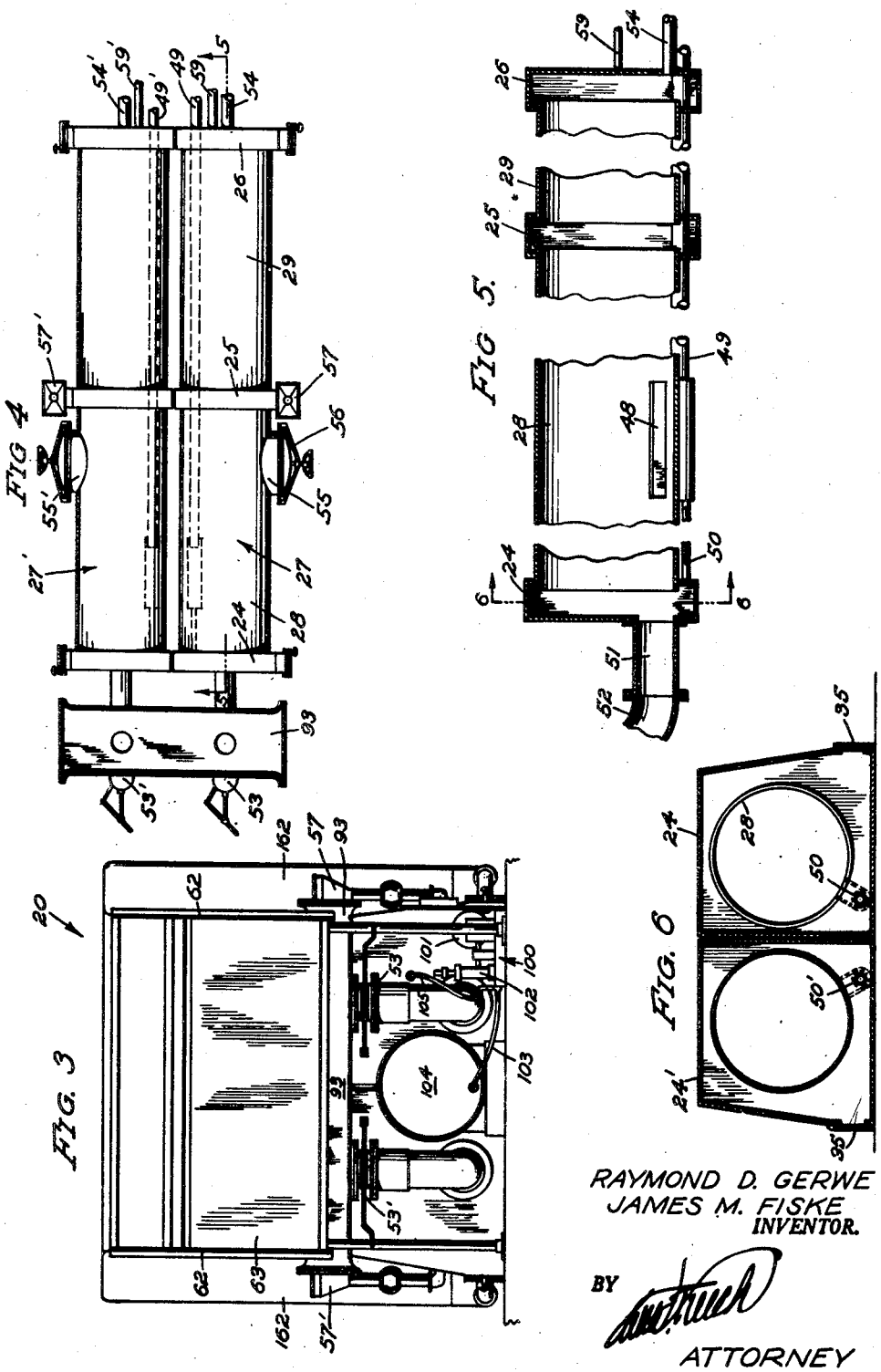

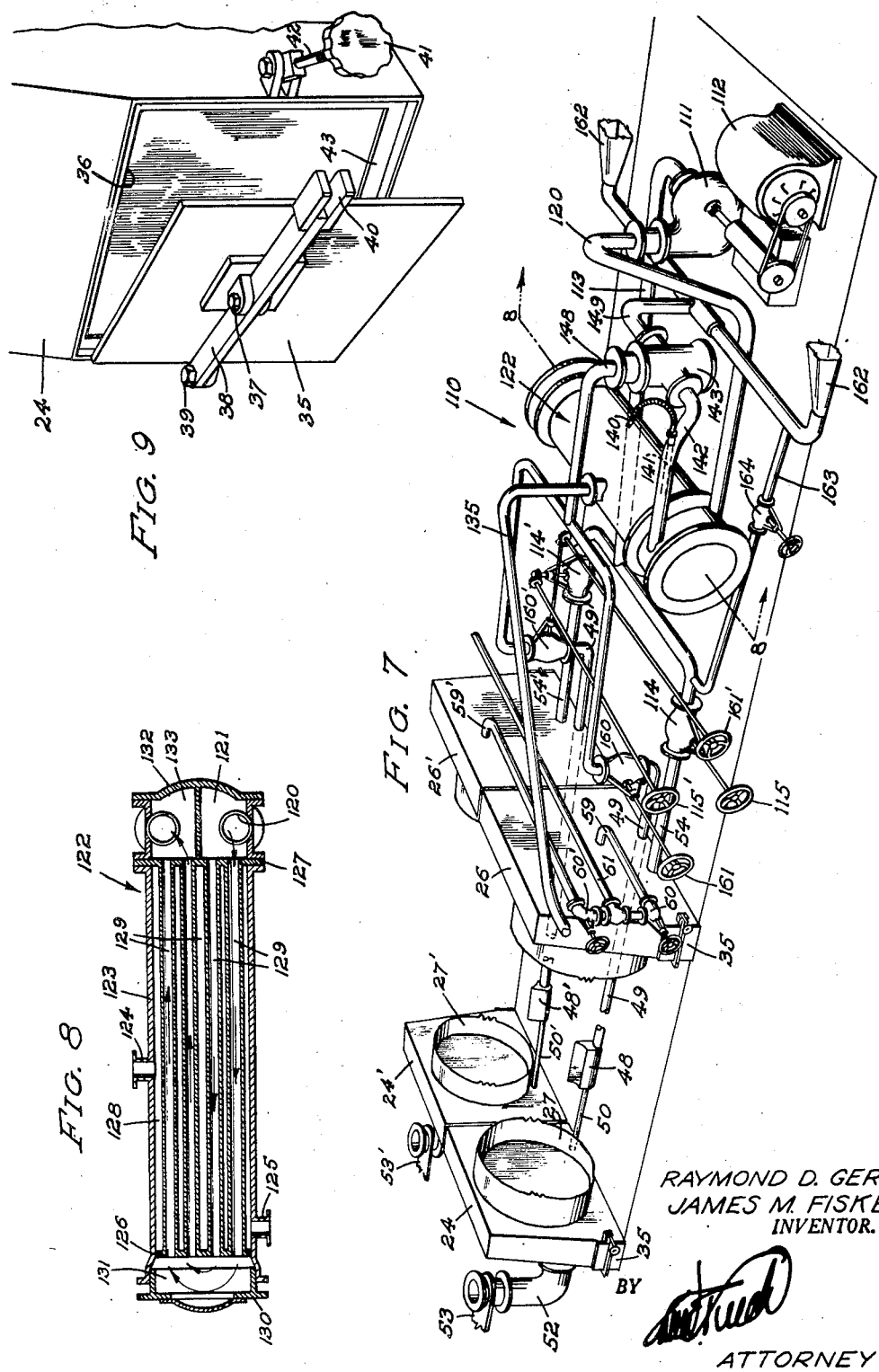

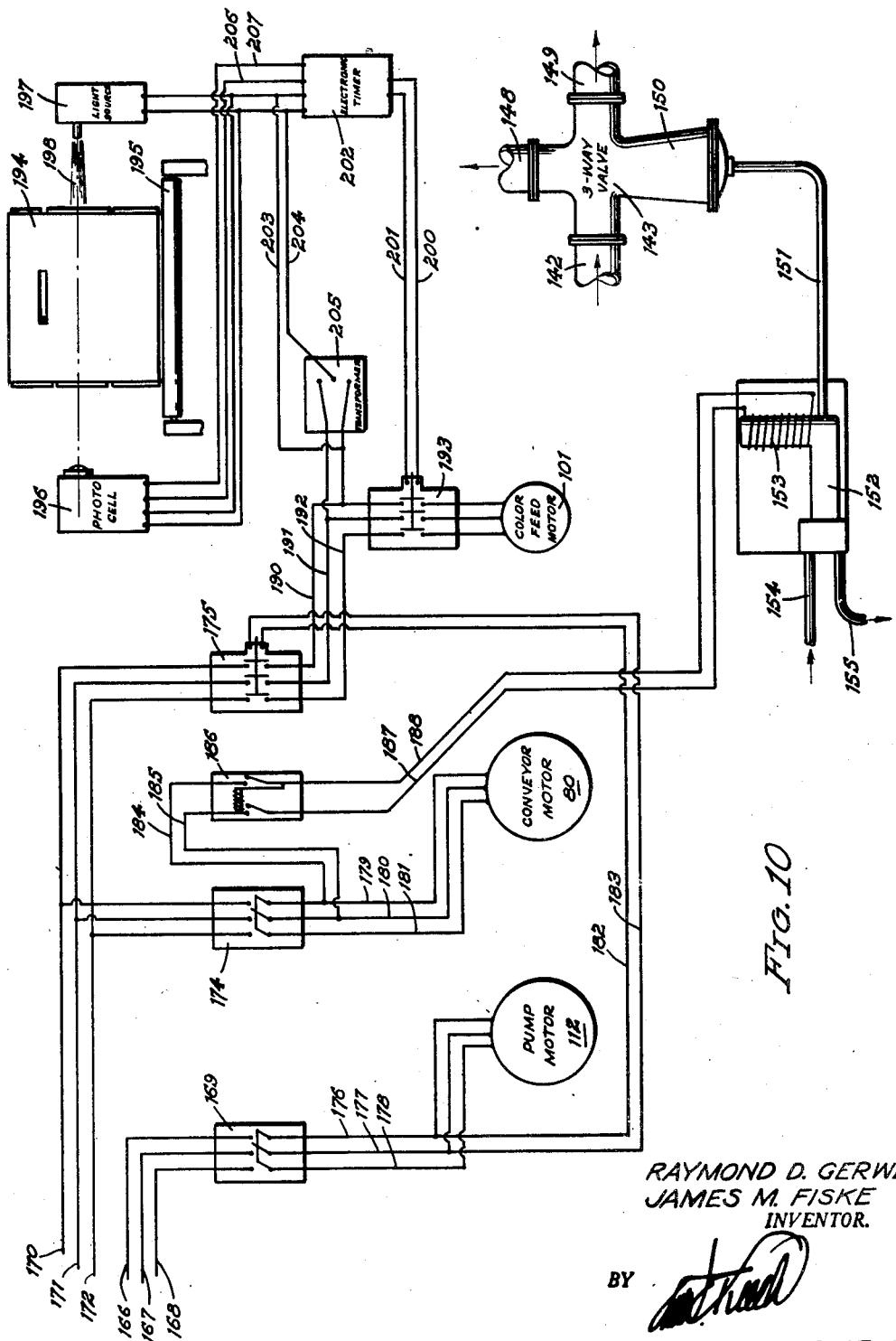

May 9, 1950

R. D. GERWE ET AL 2,507,438

METHOD OF COLORING CITRUS FRUIT

Filed Feb. 27, 1947

RAYMOND D. GERWE
JAMES M. FISKE
INVENTOR.

BY

ATTORNEY

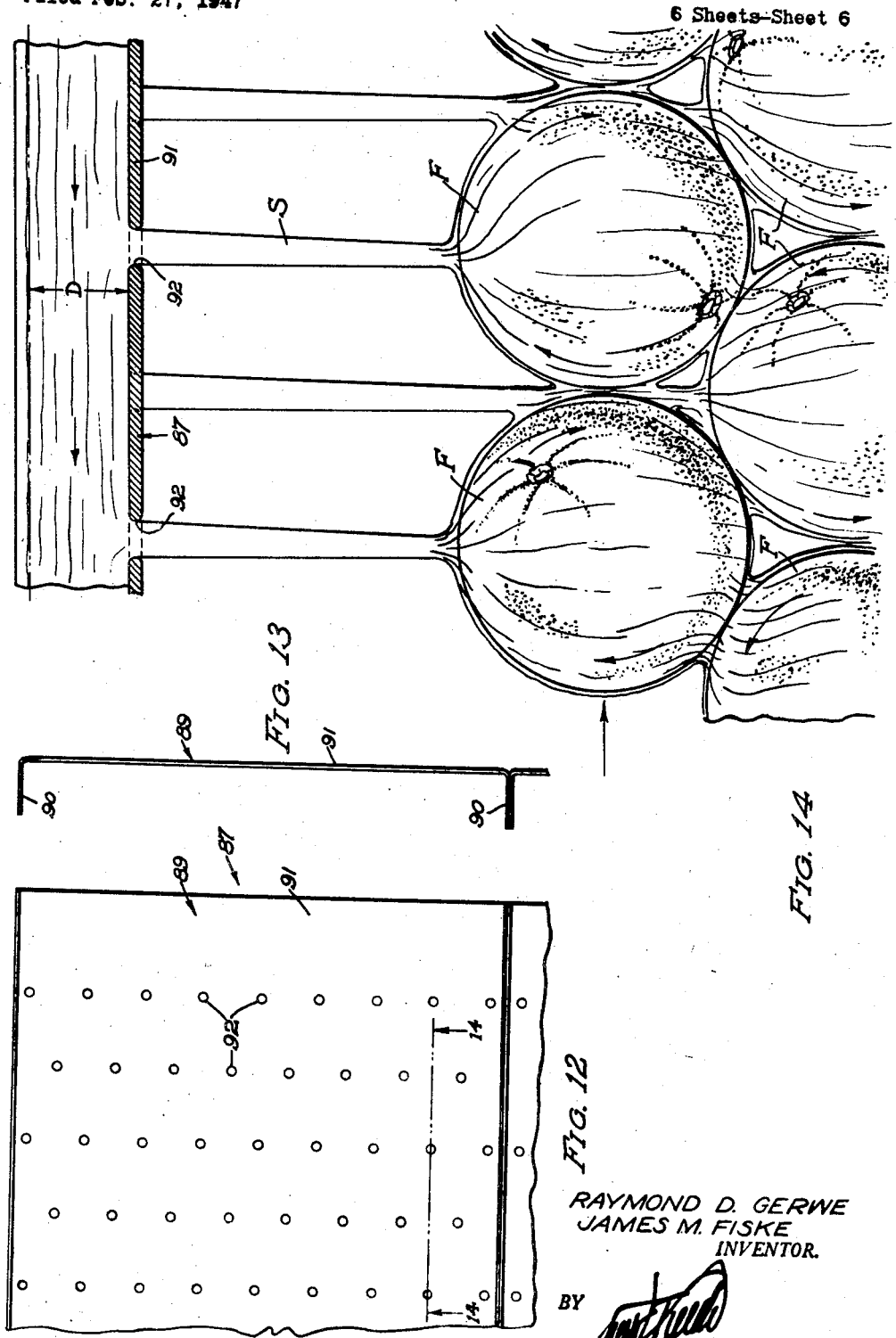

UNITED STATES PATENT OFFICE 2,507,438

METHOD OF COLORING CITRUS FRUIT

Raymond D. Gerwe, Clearwater, and James M. Fiske, Lakeland, Fla., assignors to Food Machinery and Chemical Corporation, San Jose, Calif., a corporation of Delaware Application February 27, 1947, Serial No. 731,320

4 Claims. (Cl. 99—103)

This invention relates to improvements in the art of employing an aqueous emulsion as a medium for imparting a varietal coloration to citrus fruit.

The color of citrus fruit, and particularly oranges, is a considerable factor in the price which these bring at the market and it is a well-known fact that such color varies widely in fruit of the same eating quality as measured by flavor, and by their content of juice, solids, and sugar. The public is assured of the fruit sold coming up to certain standards fixed by government as to eating quality.

In order to obtain equal remuneration for fruit of equal eating quality but differing in varietal color, growers have for many years, and with governmental approval, followed the practice where growing conditions causes a large portion of the fruit of high eating quality to be deficient in varietal color, to enhance the latter by the application of edible dye to the rind of the fruit. The processes most generally used for this purpose commercially apply this dye with the latter dissolved in an oily or waxy agent compatible with the waxy rind of the fruit and suspended in an aqueous emulsion.

This fruit coloring process is disclosed in U. S. Letters Patent to Rodney B. Harvey, No. 1,909,860, issued May 16, 1933 on the "Process of treating fruit." An improvement on the Harvey process also widely used is disclosed in U. S. Letters Patent to J. N. Sharma, No. 2,286,164, issued June 9, 1942, on "Art of coloring fruit."

Included among the objects of the present invention is the provision of a method of and apparatus for applying dye through an aqueous medium for coloring citrus fruit (1) which will reduce the amount of dye required to produce a desired depth of varietal hue on the fruit; (2) which will color all exposed areas on the fruit uniformly; (3) which will prevent cooking the fruit or burning the emulsion during shut-downs; (4) which will color the fruit at a lower temperature, with an aqueous emulsion of dye, than hitherto thought necessary; (5) that will maintain the temperature of the color bath at an optimum value during the coloring of fruit and also during intervals when the movement of fruit through the apparatus is temporarily halted, so that when movement of fruit is resumed, coloring under optimum conditions may also be resumed immediately; and (6) which will eliminate excessive foaming and attendant evils formerly suffered widely in the practice of this art.

The common practice in commercially coloring citrus fruit with an aqueous emulsion of dye has hitherto been to apply this emulsion in a spatter type of flood in which the emulsion poured through crescent shaped holes in highly turbulent streams. We have discovered that this practice results in a much less uniform coloring of the rinds of the treated fruit than is accomplished by the present invention. We have also discovered that turbulence in the delivery of the emulsion onto the fruit as well as turbulence in the pump itself, and in the conduits employed to convey the emulsion, cause foaming of the emulsion and that as a direct result of eliminating this foaming in the present invention, the dye emulsion now remains stable and resists breakdown over much longer periods than was formerly the case. The elimination of foaming by our invention has been welcomed by the citrus industry also for the reason that the foam produced in the process would over-flow the apparatus and the dye thus expelled on the floor would be tracked all over the plant and smudge up things generally.

The dye employed in coloring citrus fruit is expensive and we have discovered that the cost of producing at certain standard depth of varietal hue on the fruit may be greatly decreased by a very large increase in the volume of emulsion flooding over the fruit during the coloring thereof provided that this flooding is done through a very large number of smoothly flowing non-turbulent streams. This requires a considerable increase in the cost of equipment over that in general use, but tests have shown that the net cost of the process is greatly decreased by this feature of our invention.

In the practice preceding this invention, the fruit was colored by delivering less than one pound of emulsion onto the fruit with the spatter type flood per piece of fruit per minute that the fruit was being treated.

However, in order to obtain a satisfactory degree of coloration, it was necessary to use both excessive amounts of dye and temperature. We have discovered that by the use of smoothly flowing non-turbulent streams, we can obtain a more uniform and natural varietal hue, and with use of much less dye and lower temperature than was obtainable with the old method. We have also discovered that with this non-turbulent smooth flow optimum results are obtained when using a flow rate of approximately three pounds of color emulsion per piece of fruit per minute of treatment.

We have also discovered that losses in stability of the color emulsion are traceable to overheating when circulation was halted because breakdowns in other apparatus in the packing house suddenly required stopping the coloring apparatus with this filled with fruit. In the present invention, the over-heating of the emulsion and consequent loss of stability of the latter in such emergencies, which are not uncommon, has been eliminated by automatically by-passing the emulsion around the fruit in the apparatus at the time of such a stoppage and employing a heat exchanger which is separate from the emulsion storage tank, to heat the emulsion.

Our invention also provides a means for automatically resuming the flooding of the fruit in the apparatus with the emulsion immediately upon starting the movement of fruit through the apparatus, this emulsion, by virtue of the by-passing and continual heating of the same in the normal manner during the halting of the fruit movement, being at the optimum temperature of efficient transfer of the dye from the emulsion to the fruit surfaces.

The manner of accomplishing the foregoing objects and applying the novel principles of the invention above outlined will be made clear in the following description taken in connection with the accompanying drawings, in which:

Fig. 1 is a plan view of a preferred embodiment of the apparatus of the invention.

Fig. 2 is a side elevational view of Fig. 1 on the front or control board side thereof.

Fig. 3 is an enlarged end elevational view taken in the direction of the arrow 3 in Fig. 2.

Fig. 4 is a horizontal sectional view taken on the line 4—4 of Fig. 2.

Fig. 5 is an enlarged fragmentary vertical sectional view taken on the line 5—5 of Fig. 4.

Fig. 6 is a vertical sectional view taken on the line 6—6 of Fig. 5.

Fig. 7 is a diagrammatic perspective view of the piping system of the emulsion storage, heating and pumping system of said apparatus.

Fig. 8 is an enlarged vertical sectional view taken on the line 8—8 of Fig. 7 through the heat exchanger of said apparatus.

Fig. 9 is an enlarged perspective view of one of the dirt leg gates of the invention.

Fig. 10 is a diagram of the electrical wiring system of said apparatus.

Fig. 12 is a fragmentary plan view of a section of the flow pan of the invention illustrating a preferred arrangement of the spacing of the round, smooth edged flow orifices of this pan.

Fig. 13 is a transverse edge elevational view of Fig. 12.

Fig. 14 is an enlarged diagrammatic longitudinal fragmentary vertical section of said flow pan and a number of pieces of citrus fruit being colored in the apparatus of the invention by smooth-flowing streams of emulsion delivered from the flow orifices of said pan.

Figure 11:
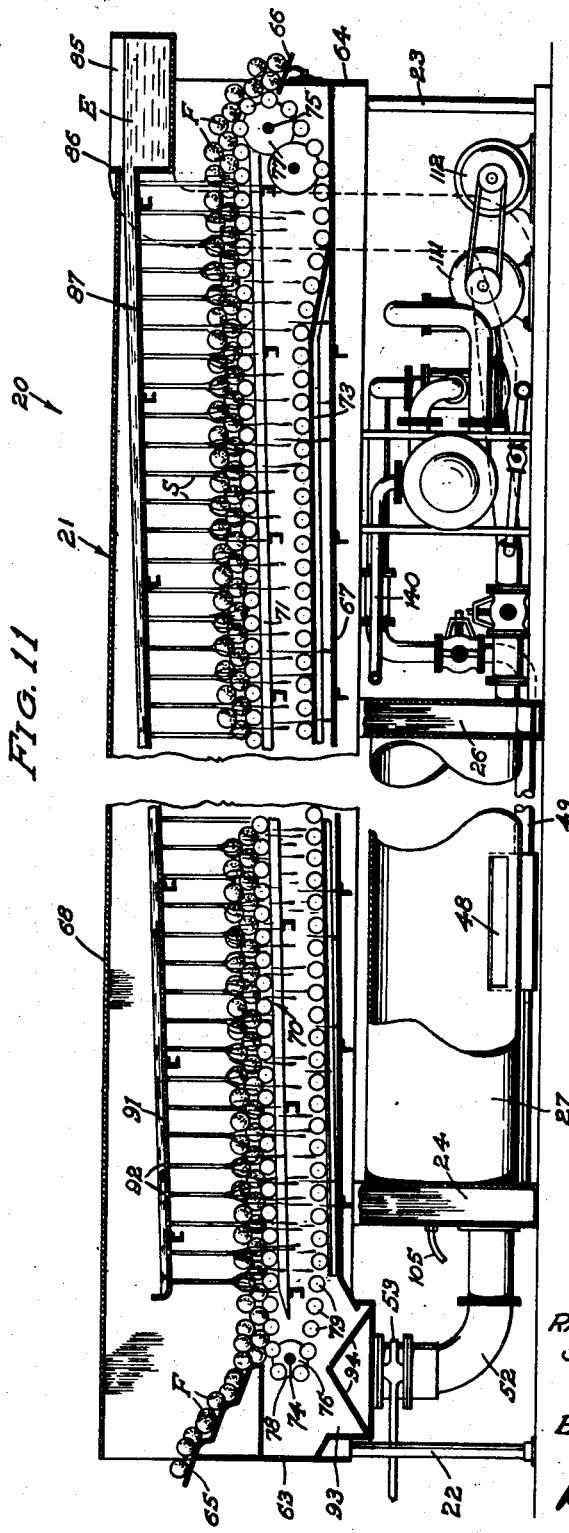
Fig. 11 is an enlarged, fragmentary, diagrammatic longitudinal vertical sectional view taken on the line 11—11 of Fig. 1 and illustrating the operation of the apparatus of the invention in performing the method thereof.

Referring specifically to the drawings, the apparatus of the invention is therein shown as embodied in a color applicator 20 having a housing 21 which rests upon legs 22 and 23, and on dirt legs 24, 25 and 26 of a color emulsion tank 27 and dirt legs 24', 25' and 26' of a hot water tank 27'.

The tank 27, having dirt legs 24, 25 and 26 embodied therewith, is a reverse duplicate of the tank 27' and its dirt legs. A detailed description of tank 27 will suffice for both, therefore, and any references made to a detail of tank 27' will be by use of the reference numeral for the corresponding detail of tank 27 with prime attached.

Each of the dirt legs 24, 25 and 26 comprises a hollow metal box structure. The tank 27 is in two sections, 28 and 29, which are joined together by dirt leg 25 into which adjacent ends of the tank sections 28 and 29 extend and to which these ends are welded. In a similar manner, the other ends of tank sections 28 and 29 extend through inner walls of dirt legs 24 and 26 and are welded to these dirt legs. Thus, the tank 27 includes within it the space within the sections 28 and 29 and the space within the dirt legs 24, 25 and 26 with which these sections make fluid-tight connections.

At its lower outer corner, each of the dirt legs 24, 25 and 26 has a dirt leg gate 35 which is mounted thereon opposite a cleaning opening 36 in this dirt leg so that this opening may be optionally closed during the operation of the applicator 20 or opened during shut-downs for the purpose of cleaning out this dirt leg.

The gate 35 (Fig. 9) is pivotally mounted by a bolt 37 on a clamp arm which is pivoted to the dirt leg at one end by a bolt 39 and has a fork 40 at its other end which is adapted to be engaged by the nut handle 41 of a screw clamp 42, also mounted on a dirt leg, to tighten the gate 35 against a suitable gasket 43 disposed in the opening 36 so as to effect a liquid-tight closing of the latter.

The tank section 28 has welded therein and connecting therewith, a by-pass box 48 with which a by-pass pipe 49 connects, this pipe also extending through and being welded to both of the dirt legs 25 and 26 without communicating with said dirt legs. The return box 48 is connected by a smaller pipe 50 with the dirt leg 24 so as to establish a communication between this box and said dirt leg.

Communicating with the dirt leg 24 at the lower end of the latter is a gravity return pipe 51 which connects by an elbow 52 with a gate valve 53. Leading from the lower end of the dirt leg 26 is an eduction pipe 54.

The tank section 28 preferably has a man-hole 55, access to which is controlled by a man-hole gate 56. Dirt leg 25 is provided with a funnel 57 for the manual introduction into the tank 27 of liquids such as color concentrate or water. Mounted on the front of the tank 27 are sight liquid level gages 58, and 58' which are connected respectively with tanks 27 and 27'.

The dirt leg 26 of the tank 27 also has a water inlet pipe 59. The pipe 59 has a valve 60, and this valve with its companion valve 60' which controls pipe 59' connect to a service water supply line 61.

The housing 21 has side walls 62 and end walls 63 and 64 on which are mounted receiving and discharge delivery boards 65 and 66. Housing 21 also has a drain floor and a sectional cover 68 which is diagrammatically shown as a single plate in Fig. 11.

Supported on the side walls 62 within the housing 21 is an endless roller conveyor 70. This includes upper flight rails 71, lower flight rails 73, shafts 74 and 75 journalled in suitable bearings provided on the walls 62, sprockets 76 and 77 mounted on said shafts, endless chains 78 trained about said sprockets and an endless series of rollers 79 pivotally supported on said chains so as to roll on said tracks 71 and 73 as shaft 75 is rotated by an electric motor 80 to cause the chains 78 to travel in the directions of the arrows adjacent thereto on Fig. 11.

Supported upon side walls 62 and extending laterally beyond these, at the discharge end of the applicator 20 is a weir box 85 having a weir opening 86 along its inner edge, the latter opening directly above the upper edge of a sloping flow pan 87 so that color emulsion may be delivered in a flat sheet from the upper portion of the weir box 85, through the weir opening 86 directly onto the flow pan 87.

As shown in Fig. 12, flow pan 87 is made in sections 89 which are laid in place alongside each other in assembling the machine this construction making it possible to readily remove this pan for cleaning purposes. Each section 89 has side walls 90 and a screen bottom 91 which is punched with holes 92, these being preferably $\frac{1}{16}$ to $\frac{3}{8}$ of an inch in diameter and spaced from 1½ to 2½ inches apart depending upon the rate at which it is desired to run the conveyor 70, this rate, of course, determining the capacity of the applicator.

As clearly indicated in Fig. 14 the holes 92 are smooth edged and are placed in staggered relation in the pan section bottoms 91.

Fig. 11 shows how the pan 87, conveyor 70 and the drain bottom 67 are all inclined downwardly from the fruit discharge end of the applicator to the fruit receiving end thereof. Here a sump box 43 is mounted on the side walls 62, the lower end of the floor 67 draining into this box which is provided with screens 94 for screening trash from the emulsion passing therethrough. The gate valve 53 of the tank 27 and gate valve 53' of the tank 27' (see Figs. 3 and 4) connect with and open downwardly from the sump box 93.

By virtue of the inclination of the conveyor 70, the receiving end thereof is disposed beneath the stepped delivery board 65 at the left end of the applicator in Fig. 11, whereas the right end of this conveyor is disposed above the delivery board 66. Thus, fruit received from the delivery board 65 tends to pile up in a double layer so that the entire length of the upper flight of the conveyor resting on the track 71 is covered with a double layer of fruit. At the right end of the machine this fruit is delivered onto the delivery board 66 and discharged from the applicator. Suitable conveyors, not shown, are provided for delivering fruit to the delivery board 65 and taking it away from the delivery board 66.

The inclination of conveyor 70 has another important advantage in that it is parallel with and close to the flow pan 87 whereby the emulsion flows short and substantially uniform distances from the pan to the fruit whereby optimum, non-turbulent flow conditions are uniformly maintained throughout the coloring of the fruit.

Located preferably under the housing 21 adjacent the dirt leg 24 is a color concentrate pump unit 100 having a motor 101 which is connected through suitable transmission to a pump 102 to which a supply line 103 leads from a concentrate drum 104 and from which a discharge line 105 leads to and connects with the dirt leg 24 (Figs. 2, 3 and 11). The manner in which the color pump unit functions will be made clear in describing the operation of the applicator 20.

Referring now to Fig. 7, the applicator 20 has a color emulsion heating and pumping system 110. This includes a relatively large capacity centrifugal pump 111 driven by a motor 112, the inlet end of the pump 111 being connected by a pipe 113 to valves 114 and 114' which connect, in turn, to emulsion eduction pipes 49 and 49'. The valves 114 and 114' have hand wheels 115 and 115' which journal in suitable bearings provided on a control board 116 (Fig. 2).

The discharge end of the pump 111 is connected by pipe 120 with an inlet chamber 121 of a heat exchanger 122 (see Fig. 8). This heat exchanger has a shell 123 having a steam inlet 124 and a condensate outlet 125 leading to a steam trap (not shown). The shell 123 has heads 126 and 127 which close opposite ends of the shell 123 to provide a steam chamber 128. Fixed in these heads and extending through this chamber are color emulsion pipes 129. A cap 130 fits into the end of the shell 123 just outside of the head 126 to form a reversing chamber 131 while a cap 132 cooperates with the head 127 at the opposite end of the shell 123 to form inlet chamber 121 and an outlet chamber 133. Certain of the pipes 129 connect with the inlet chamber 121, these being connected by the chamber 131 with the other pipes 129, said other pipes connecting in turn with the outlet chamber 133.

Steam is supplied to the steam inlet 124 by a steam pipe 135 leading from a thermostatically controlled valve 136 which is connected through a manual valve 137 with a service steam line 138. The valve 136 has a Sylphon unit 139 which is controlled through a tube 140 by a fluid thermostat 141 located in a pipe 142 which leads out of the outlet chamber 133 of the heat exchanger 122 and connects with a three-way automatic valve 143, the operation of which will be made clear hereinafter. The automatic valve 136 has a by-pass line 144 with a valve 145, the opening of which permits steam to be delivered to the heat exchanger 122 free from control by the valve 136.

The valve 142 also connects with pipes 148 and 149 (see Fig. 10). It has an actuating Sylphon 150 which is connected by a hydraulic pressure line 151 with a valve 152 controlled by a solenoid 153 which, when de-energized, connects the line 151 with a domestic water line 154 and, when energized, shuts off the domestic water line 154 and connects the pressure line 151 with a drain pipe 155.

The pipe 148 leading from the 3-way valve 147 is split and connects with valves 160 and 160' which in turn connect respectively with pipes 49 and 49'. The valves 160 and 160' have hand wheels 161 and 161' which pivot in bearings provided in the control board 116.

Pipe 149 leading from the 3-way valve 147 is split and connects to each of a pair of risers 162 which are relatively large in cross section, with oppositely turned curves at the top and bottom and directly connecting with the outer forward portions of the weir box 85, the latter extending laterally beyond the side wall 62 a sufficient distance so that the upper ends of the risers 162 open into the weir box in a direction parallel with the longitudinal axis of the housing 21.

Connecting the pipe 113 and the pipe 149 is a weir box drain pipe 163 having a valve 164.

Referring now to Fig. 10, which shows the wiring diagram of the applicator 20, electricity is supplied through conductors 166, 167 and 168 to a switch 169 and through conductors 170, 171 and 172 to two switches, 174 and 175.

The conductors 166, 167 and 168 connect with the main supply circuit for the packing house.

The conductors 170, 171 and 172 connect with a circuit from which the conveyors of all the equipment, with which the applicator 20 is in series, are driven. That circuit is controlled by a master switch (not shown) by which all these conveyors are stopped at once when trouble in one of them develops.

The switch 169 is connected through conductors 176, 177 and 178 with the pump motor 112. The switch 174 connects through conductors 179, 180 and 181 with the conveyor motor 80. Conductors 182 and 183 lead from conductors 176 and 177 to magnetic switch 175 and close this switch whenever switch 169 is closed. Conductors 184 and 185 lead from conductors 179 and 180 to a magnetic switch 186 which is connected by conductors 187 and 188 with the solenoid 153 so that this solenoid is energized when switch 174 is closed when circuit 170—171—172 is hot and switch 186 is closed. Solenoid 153 is de-energized whenever switch 186 opens, which occurs automatically whenever circuit 184—185 is de-energized as by opening switch 174 or by opening the master switch (not shown) which controls circuit 170—171—172.

The switch 175 connects through conductors 190, 191 and 192 to a magnetic switch 193 which supplies current to the color feed motor 101.

The method of this invention provides for fortifying the strength of the color emulsion employed in direct proportion to the amount of fruit passing through the applicator 20 and makes use of the boxes by which this fruit is dumped into the initial piece of equipment in the series which includes the applicator 20 for controlling the motor 101 and determining the amount of color cencentrate fed for this purpose. In the diagram of Fig. 10 this box 194 is shown as it travels on an empty box conveyor 195 away from the dumping point just after it has been emptied of fruit. Mounted on opposite sides of the conveyor is a photocell 196 and light source 197, the latter projecting a light beam 198 which is aligned to energize the photocell when not interrupted by a box 194. Controlling the switch 193 through conductors 200 and 201 is an electronic timer 202 which determines the length of time the color feed motor 101 is energized each time the energizing of a photocell 196 by the light beam 198 is interrupted by the passage of a box 194.

Current is supplied from the conductors 190 and 191 either directly through conductors 203 and 204 or through a transformer 205 to the photocell 196, the light source 197 and the electronic timer 202. Connecting the photocell 196 to the electronic timer 202 for controlling the latter, in response to the cell being de-energized by interruption of the beam 198, are conductors 206 and 207.

Operation

The applicator 20 is adapted to be employed optionally as an applicator for coloring fruit or for disinfecting the latter. When used as a color applicator, the tank 27 is in service and the tank 27' is valved-off out of service. When used for disinfecting fruit, the tank 27 is valved-off out of service and the tank 27' is placed in service and used for storage of the disinfecting solution. As we are primarily interested in employing the applicator 20 in the coloring of fruit, the operation of this when so used will now be described.

Starting with all the switches open and all valves closed and with the color tank 27 charged with color emulsion at room temperature, valves 53, 160 and 114 are opened (Fig. 7). The manual steam valve 137 (Fig. 1) is now opened, admitting steam to the heat exchanger 122 and switch 169 (Fig. 10) is closed, placing the emulsion pump 111 (Fig. 7) in operation.

By virtue of the fact that the switches 174 and 186 are as yet open, the solenoid 153 (see Fig. 10) is de-energized, causing the valve 152 to connect the valve control line 151 with the drain 155 so that the 3-way valve 143 is caused to automatically connect pipe 142 with pipe 148. The pump 111, therefore, now sucks emulsion from the tank 27 through the pipe 54, valve 114 and pipe 113 and returns this emulsion to said tank through the pipe 120, heat exchanger 122, pipe 142, valve 143, pipe 148, valve 160, pipe 49 and by-pass box 48.

This circulation of the color emulsion in the tank 27 through the heat exchanger 122 raises the temperature of the emulsion until it reaches a predetermined temperature as it passes the thermostat 141 in the pipe 142, whereupon this thermostat operates the Sylphon 139 of the steam control valve 136 so as to decrease the flow of steam through the pipe 135 to the heat exchanger to just that amount necessary to hold the stream of emulsion passing the thermostat 141 to the desired temperature. While the emulsion is thus being brought up to optimum coloring temperature, no other parts of the machine are in operation.

When the apparatus preceding the applicator 20 in the series of devices handling the fruit to be colored is filled with fruit and this is about to be delivered over the delivery board 65 into the applicator 20, the switch 174 is closed. This places the conveyor 70 in operation so that fruit delivered onto said conveyor will form a double layer thereon and be conveyed through the applicator 20. As soon as fruit enters the applicator, the switch 186 is manually closed, which energizes the solenoid 153, causing the 3-way valve 143 to be shifted to connect pipe 142 with the pipe 149. This halts the returning of the emulsion from the heat exchanger 122 directly to the storage tank 27 and causes the emulsion, after leaving the heat exchanger, to be delivered through the risers 162 to the weir box 85.

Entering the latter at opposite sides in the opposite direction from that in which it flows through the weir opening 86 onto the flood pan 87, the emulsion forms a very smooth, flat stream as it pours through said weir opening and over said pan.

In performing the method of this invention, it has been found essential to have a depth D of at least one inch of emulsion in the stream of the latter flowing over the pan 87 in order that streams S of the emulsion flowing through flow orifices 92 will be unbroken by any turbulence in their travel downwardly into contact with citrus fruit F traveling through these streams on the conveyor 70. Other factors contributing to non-turbulence in the streams S are the elimination of sharp corners throughout the emulsion pumping system 110 by using flanged pipe of large diameter; the large cross sectional area of the risers 162; the connection of these risers with the weir box 85 to deliver the emulsion thereto in a reverse direction from that in which the emulsion flows from the weir box onto the flood pan 87; and the substantial depth of the weir box 85 so that any turbulence set up in the liquid is substantially dissipated by the time the liquid flows through the weir opening 86 onto the flood pan 87.

To illustrate the peculiar action of the streams S, an enlarged view of these streams and the manner in which they impinge on the fruit F is shown in Fig. 14. Here it is seen that the non-turbulent character of these streams and the fact of their being delivered gravitationally downward from their points of origin close above the fruit while the latter is being rotated and conveyed through these streams on the conveyor 70, results in an almost complete lack of turbulence in the sheet of emulsion spreading over these fruit surfaces from each point of impingement of the stream S with a piece of fruit. Arrows on the pieces of fruit in this figure illustrate the directions of rotation of the individual pieces of fruit while a horizontal arrow adjacent the fruit indicates the direction in which this travels on the conveyor 70 relative to the streams S.

The necessary minimum depth D of emulsion throughout the pan 87 is obtained by delivering such a stream of emulsion through the weir opening 86 that, in spite of depletions of this through discharge of emulsion therefrom through the orifices 92, this stream has a depth in excess of one inch when it reaches the lower end of the pan.

The speed of the conveyor 70 is set to give the required time of treatment of the fruit in the applicator 20 and uniformity of treatment of the fruit in the applicator is thus secured regardless of fluctuations in the volume of fruit fed thereto. At maximum capacity the fruit doubles up on the conveyor to form two layers thereon, as shown in Fig. 11. The volume of fruit may be cut in half, however, to where there is only one layer of fruit carried by the conveyor 70 without varying the varietal hue attained in the treated fruit. This is because, for a given length of treatment with an emulsion of a given strength, it is immaterial whether the fruit is in the upper or lower layer, the absorption of color applied in accordance with our method being the same in both instances.

The resulting flexibility in capacity of the applicator 20 may be attributed largely to the automatic color pump unit 100 which operates in response to the dumping of each box of fruit fed to the applicator 20. When a box of fruit 194 is thus dumped, the empty box is discharged along the conveyor 195 so as to interrupt the light beam 198, thereby reacting on the photo cell 196 to throw in the switch 193 and energize the color feed motor 101. The electronic timer 202 is adapted to be set to open the switch 193 after the motor 101 has operated for a fixed interval. In practice, the electronic timer 202 is set, for instance, to allow the motor 101 to run just five seconds each time a box 194 breaks the light beam 198. This has been found to deliver into the emulsion an amount of color equivalent to that which is absorbed by one box of fruit. The strength of the color emulsion is thus automatically kept uniform throughout the day's operations. It has been found unnecessary to check the concentration of color oftener than once a day, as a result of the accuracy of this feature of our invention.

When such a check indicates the strength of the color emulsion is below normal, additional concentrate may be fed into the emulsion in the tank 27 through the funnel 57 or, by manually holding the switch 193 closed for a calculated period, color pump 100 may be employed to bring the emulsion up to normal strength. The liquid level gage 59 offers a constant check on the quantity of emulsion in the tank 27 so this may be built up by adding water and color concentrate thereto whenever depletion makes this necessary.

Water may be fed to the tank 27 from the water line 61 by opening the valve 60 until the desired amount of water has passed from this through the pipe 59 into the tank 27.

Another advantage of the applicator 20 is in the protection afforded the emulsion from local over-heating adjacent the heating pipes, which in the former practice, passed directly through the emulsion storage tank. During emergency shut-downs of the apparatus, the flooding of the emulsion was halted, whereupon there was no circulation in the storage tank and local over-heating of the emulsion adjacent the heating pipes would cause the cooking of the color and the caking of this on the pipes. This not only removed the color from the emulsion, thus lowering the effective strength of the latter, but promoted the breakdown or separation of the emulsion which rendered this ineffective in coloring the fruit.

Any time during the operation of the applicator 20, when the conveyor 70 is shut down for any reason, the circuit 184—185 becomes dead, with the result that the three-way valve 143 by-passes the flow of emulsion from the heat exchanger 122 to the storage tank 27 while maintaining circulation through the heat exchanger and said storage tank. As the thermostatic element 141 constantly restricts the supply of steam to the heat exchanger 122 to that amount which will heat the emulsion passing therethrough to a given maximum temperature, the emulsion is never over-heated during shut-downs. Furthermore, since the emulsion is always circulating through the heat exchanger 122, the color is never cooked and deposited on the heat exchange surfaces as a result of local overheating.

The constant circulation of the emulsion through tank 27 and heat exchanger 122 while the conveyor is shut down makes possible immediate resumption of the coloring operation with the emulsion at optimum temperature just as soon as the conveyor 70 is again placed in operation. The great advantage of this is that the fruit resting on the conveyor in the applicator 20 during the shut down period receives the same amount of color treatment, in spite of the interruption of the application of color thereto, as other fruit, the coloring of which has been continuous.

The starting of the conveyor 70 and the coincidental resumption of coloring operations is effected by energizing the circuit 170—171—172 (in case this entire circuit had been cut out) or by throwing in the switch 174 (in case this had been opened to stop the conveyor 70) and then manually closing the switch 186. After this switch 186 has been manually closed, it automatically remains closed, but it always automatically opens when the circuit 184—185 becomes dead and stays open until again manually closed at a moment when the circuit 184—185 is live.

When starting the applicator 20, the initial delivery of emulsion to the flow pan 87 cools this emulsion three or four degrees until the pan 87 has been brought up to normal emulsion temperature. This takes four or five minutes of operation. This can be prevented where an operator is free to attend to this by heating the emulsion a few degrees above the normal operating temperature just before the conveyor 70 is started and the emulsion first delivered to the flow pan 87. Such slight over-heating is harmless and may be accomplished by opening the valve 145 temporarily to permit steam to flow to the heat exchanger 122 in excess of that permitted by the automatic valve 136. Upon commencing coloring operations, however, valve 145 may be closed, whereupon the emulsion will be delivered through the orifices 92 against the fruit F at substantially its optimum coloring temperature from the very beginning of the coloring operation.

The dirt legs 24, 25 and 26 are provided for the collection of solids washed from the fruit by the emulsion. Access may be had to the interiors of these dirt legs by the cleaning gates 35. The man hole gate 56 is for permitting a man to crawl into the tank 27 for purposes of repairing or cleaning this.

While this invention relates primarily to the coloring of fruit, the preferred apparatus embodying the invention and illustrated in the attached drawings includes provision for flooding fruit with a bath of hot water of a disinfecting solution so that the color applicator may be used optionally for these other purposes, as well as for the applying of color to fruit. Although no part of the present invention, this alternate utility of the applicator 20 may be briefly explained.

When desiring to switch from using the applicator 20 as a color applicator to its use as a hot water applicator, for instance, the tank 27' is charged with water by opening the valve 60'. The valve 164 is now opened and the pump 111 operated with the switch 186 open and the valves 53 and 114 closed, the pump 111 now draining the color emulsion from the weir box 85 and risers 162 and discharging this from the pump through the pipe 120. When this has been completed, the only color emulsion left outside the tank 27 is in the pipe 120, the heat exchanger, the pipe 142 and the pipe 148. The valves 160 and 164 are now closed and the valves 53', 114' and 160' opened so that the pump 111 will start to circulate water from the tank 27' through the heat exchanger 122 and then return this through the return box 48' to the tank 27'. The small amount of color emulsion noted as being outside the tank 27, when the switch to water is made, is mixed with the water without harming the latter for its intended purpose.

The applicator 20 is now in readiness to deliver the streams of hot water through the orifices in the flood pan 87 onto the fruit on the conveyor 70 by placing the latter in operation and closing switch 86.

By a reversal of the steps just described, a switch may be effected in operating the applicator 20 to return from applying hot water to the fruit to applying color emulsion thereto.

The claims are:

1. A method of coloring fresh, whole citrus fruit which consists in rotating and conveying said fruit in a layer along a substantially horizontal path, and flooding said fruit while it is so travelling with an aqueous emulsion of edible dye at the rate of approximately three pounds of emulsion per piece of fruit per minute of travel along said path, said emulsion being so flooded on said fruit in a multiplicity of closely-spaced, small, smooth-flowing streams, originating from a bed at a level close above said fruit, said bed being maintained in sufficient depth to insure smooth flowing streams.

2. A method of coloring fresh whole citrus fruit which consists in conveying said fruit in a layer along a substantially horizontal path, and flooding said fruit while it is so traveling with an aqueous emulsion of edible dye at the rate of approximately three pounds of emulsion per piece of fruit per minute of travel along said path, said emulsion being so flooded on said fruit by causing it to over-flow onto a pan superposed above said path and perforated with smooth-edged, circular holes with a diameter of approximately $\frac{1}{16}$ inch and spaced approximately two inches apart by maintaining a smooth-flowing body of emulsion on said pan with a depth of at least one inch, and forming a multiplicity of smooth flowing streams from said holes to the fruit.

3. A method of coloring fresh, whole citrus fruit which consists in rotating and conveying said fruit in a layer along a substantially horizontal path, forming and maintaining a traveling layer of an aqueous emulsion of edible dye, said emulsion layer constituting a bed disposed substantially parallel to and closely spaced over said fruit layer and traveling in the opposite direction thereto, subdividing said emulsion layer into a multiplicity of closely-spaced, small, smoothly flowing streams, said emulsion bed being maintained in sufficient depth to insure said smoothly flowing streams, said streams flooding said fruit at the rate of approximately three pounds of emulsion per piece of fruit per minute of travel thereof.

4. A method of coloring fresh, whole citrus fruit which consists in rotating and conveying said fruit in a layer along a substantially horizontal path, forming and maintaining a traveling layer of an aqueous emulsion of edible dye, said emulsion layer being substantially parallel to said fruit layer and having a depth of approximately one inch, subdividing said emulsion layer into a multiplicity of closely-spaced, small, smoothly flowing streams, said streams flooding said fruit at the rate of approximately three pounds of emulsion per piece of fruit per minute of travel thereof.

RAYMOND D. GERWE.
JAMES M. FISKE.

REFERENCES CITED

The following references are of record in the file of this patent:

UNITED STATES PATENTS

| Number | Name | Date |
|---|---|---|
| 2,112,580 | Skinner | Mar. 29, 1938 |
| 2,119,914 | Holzcker | June 7, 1938 |
| 2,249,792 | Skinner | July 22, 1941 |
| 2,286,164 | Sharma | June 9, 1942 |